Jan. 9, 1934.   H. ARNI   1,942,403
FEEDING DEVICE FOR A SPECIAL LATHE
Filed July 26, 1932
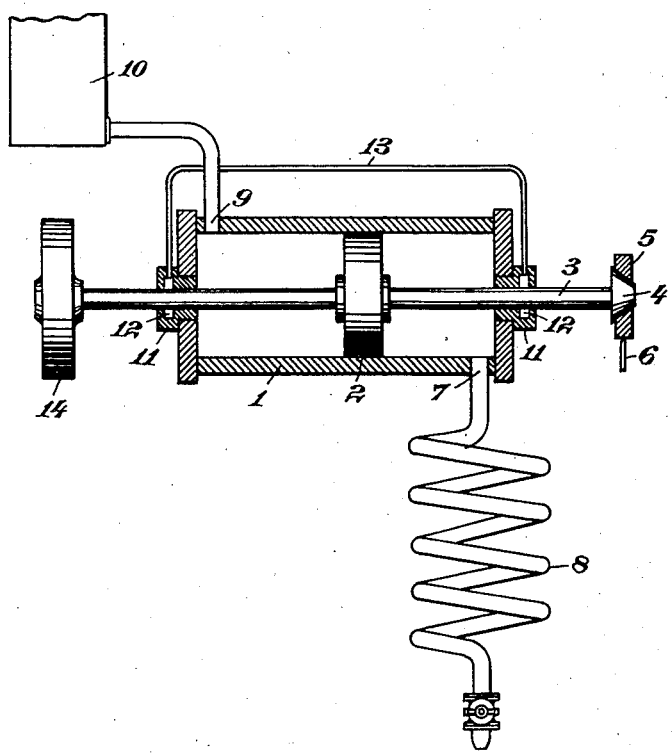
INVENTOR
Hans Arni
BY: Gifford, Scull & Burgess
ATTORNEYS.

Patented Jan. 9, 1934

1,942,403

UNITED STATES PATENT OFFICE 1,942,403

FEEDING DEVICE FOR A SPECIAL LATHE

Hans Arni, Falkensee, near Berlin, Germany, assignor to Siemens & Halske, Aktiengesellschaft, Siemensstadt, near Berlin, Germany, a corporation of Germany Application July 26, 1932, Serial No. 624,814, and in Germany July 27, 1931

8 Claims. (Cl. 82—5)

This invention relates to a device enabling objects to be moved forward at a very slow well-defined speed, which can, more particularly be kept very constant.

The invention is, for instance, utilized in manufacturing goffering cylinders for lenticulated films, whereby very low-pitched spiralled grooves are engraved on the rollers. This pitch is about 0.03 mm. and must be adhered to with considerable accuracy. The new device permits of obtaining a rigorously constant feed of the cylinder thus enabling a spiral of great uniformity to be engraved at constant speed of the cylinder.

According to the invention, in order to obtain the desired movement, a shiftable piston is arranged within a cylindrical vessel filled with a fluid, and a difference in pressure between the two parts of the vessel, separated by the piston, is obtained by providing an opening in the vessel, through which the fluid, present on one side of the piston, can slowly leak off. Said difference is required for driving the piston. It is associated with a sliding rod to which the objects which are to be moved forward, i. e. the goffering cylinder may be fastened.

The new device is shown in the figure in section. 1 means here the cylindrical vessel, within which the sliding piston 2 is arranged. The piston is fitted on the shaft 3 which is to carry at 4 the object to be moved. This may for instance be the roller 5, on which a spiral is engraved with the aid of the diamond 6.

For the reliable working of the device it is essential that the speed at which the fluid medium—preferably use may be made of oil—contained in the vessel 1 leaks off can be maintained accurately constant. For this end, a long tubing is connected at the outlet 7 for the oil. This enables the amount of the oil leaking off in a second to become largely independent of the slight fluctuations in pressure occurring at the outlet and of the variations in friction at the piston and the bearings. The leaking off speed is then, for the greater part, determined by the frictional resistance of tubing 8. In order to obtain the greatest possible constancy, the difference in pressure between the interior of the vessel and the outer space should be uniformly maintained. This can be achieved by making the pressure within the vessel to a sufficient degree higher than the pressure in the outer space, to the effect that small variations in pressure are of little consequence as compared with the mean difference in pressure. Preferably the pressure of the air should act at the inlet in much the same manner as at the outlet.

Since the leaking off speed can be most accurately maintained by means of the long tubing 8, the feed of the piston can be made very uniform, irrespective of whether there occur small differences in the frictional resistance of the piston or not.

With the aid of a tubing, the oil is pressed at 9 from the pressure chamber 10 into the cylindrical vessel. This tubing also can be made long and narrow in order to ensure, within the limits possible, a uniform feed.

In order to prevent oil to escape from within the vessel between the walls and the sliding rod 3, thus giving rise to an inconstancy of the feed, the sliding rod has been stuffed up by bushes so that the fluid can by no means leak off. Such bushes 11 are, for instance, constructed so as to have chambers 12 which surround the shaft in a circular manner and in which by means of tubings 13 oil is permanently kept at the same pressure as is present within the vessel. Several such chambers may be connected in series and provision may be made for stuffing rings well-known in the art.

In order to prevent the fluid to pass from the left part into right part of the cylindrical vessel 1, the piston 2 is in contact with a large area of the cylinder walls. As the very slow feed of the piston might involve a disturbing friction due to sticking, the piston is permanently set in rotational motion. For this end, provision is made on the shaft 3 for the wheel 14. This wheel also serves for a uniform drive, when the cone carries the cylinder 5 on which a spiral is engraved.

An irregular feed of the piston can be produced not only by variations in pressure but also by fluctuations in temperature. As the inner friction of the fluids is largely dependent on temperature, the slightest fluctuations in temperature have already a considerable bearing on the speed at which the fluid leaks off through tubing 8. It is therefore necessary to maintain the whole device in operation at a constant temperature, which may be preferably achieved by fitting it within a thermostat well-known in itself.

I claim:

1. In a device of the class described, a cylinder having a piston slidable therein, an inlet to said cylinder on one side of said piston, an outlet from said cylinder on the other side of said piston, a shaft connected to said piston and extending through one end of said cylinder, means to supply fluid under pressure to said cylinder through said inlet, means to slowly withdraw fluid from the cylinder through said outlet, and means, cooperating with said shaft as it is moved by the piston, to form a spiral groove upon a cylindrical object.

2. In a device of the class described, a cylinder having a piston slidable therein, an inlet to said cylinder on one side of said piston, an outlet from said cylinder on the other side of said piston, a shaft connected to said piston and extending through one end of said cylinder, means to supply fluid under pressure to said cylinder through said inlet, means to slowly withdraw fluid from the cylinder through said outlet and comprising an extended small tube connected to said outlet, and means, cooperating with said shaft as it is moved by the piston, to form a spiral groove upon a cylindrical object.

3. In a device of the class described, a cylinder having a piston slidable therein, an inlet to said cylinder on one side of said piston, an outlet from said cylinder on the other side of said piston, a shaft connected to said piston and extending through one end of said cylinder, means to supply fluid under pressure to said cylinder through said inlet, means to slowly withdraw fluid from the cylinder through said outlet, means, cooperating with said shaft as it is moved by the piston, to form a spiral groove upon a cylindrical object, and means for rotating said piston in the cylinder during its movement lengthwise thereof.

4. In a device of the class described, a cylinder having a piston slidable therein, an inlet to said cylinder on one side of said piston, an outlet from said cylinder on the other side of said piston, a shaft connected to said piston and extending through one end of said cylinder, means to supply fluid to said cylinder at said inlet and to withdraw it from said cylinder at said outlet, means to maintain a substantially constant difference in pressure between said inlet and outlet, and means, cooperating with said shaft as it is moved by the piston, to form a spiral groove upon a cylindrical object.

5. In a device of the class described, a cylinder having a piston slidable therein, an inlet to said cylinder on one side of said piston, an outlet from said cylinder on the other side of said piston, a shaft connected to said piston and extending through one end of said cylinder, means to supply fluid to said cylinder at said inlet and to withdraw it from said cylinder at said outlet, means to maintain a substantially constant difference in pressure between said inlet and outlet, means, cooperating with said shaft as it is moved by the piston, to form a spiral groove upon a cylindrical object, and means for rotating said piston in the cylinder during its movement lengthwise thereof.

6. In a device of the class described, a cylinder having a piston slidable therein, an inlet to said cylinder on one side of said piston, an outlet from said cylinder on the other side of said piston, a shaft connected to said piston and extending through one end of said cylinder, means comprising a small extended tube to supply fluid under pressure to said cylinder through said inlet, means to slowly withdraw fluid from the cylinder through said outlet, and means, cooperating with said shaft as it is moved by the piston, to form a spiral groove upon a cylindrical object.

7. In a device of the class described, a cylinder having a piston slidable therein, an inlet to said cylinder on one side of said piston, an outlet from said cylinder on the other side of said piston, a shaft connected to said piston and extending through one end of said cylinder, means comprising a small extended tube to supply fluid under pressure to said cylinder through said inlet, means to slowly withdraw fluid from the cylinder through said outlet and comprising an extended small tube connected to said outlet, and means, cooperating with said shaft as it is moved by the piston, to form a spiral groove upon a cylindrical object.

8. In a device of the class described, a cylinder having a piston slidable therein and having extended contact with the wall thereof, an inlet to said cylinder on one side of said piston, an outlet from said cylinder on the other side of said piston, a shaft connected to said piston and extending through one end of said cylinder, means to supply fluid under pressure to said cylinder through said inlet, means to slowly withdraw fluid from the cylinder through said outlet, and means, cooperating with said shaft as it is moved by the piston, to form a spiral groove upon a cylindrical object.

HANS ARNI.